(12) United States Patent
Dahn et al.

(10) Patent No.: US 11,526,867 B2
(45) Date of Patent: Dec. 13, 2022

(54) PUSH PAYMENT DECISION ROUTING

(71) Applicant: Stripe, Inc., San Francisco, CA (US)

(72) Inventors: Michael David Dahn, San Francisco, CA (US); Eduardo Serrano, Mexico City (MX)

(73) Assignee: Stripe, Inc., San Francisco, CA (US)

( * ) Notice: Subject to any disclaimer, the term of this patent is extended or adjusted under 35 U.S.C. 154(b) by 104 days.

(21) Appl. No.: 16/288,954

(22) Filed: Feb. 28, 2019

(65) Prior Publication Data

US 2020/0279242 A1 Sep. 3, 2020

(51) Int. Cl.
*G06Q 20/00* (2012.01)
*G06Q 20/32* (2012.01)
*G06Q 20/40* (2012.01)
*H04L 67/55* (2022.01)

(52) U.S. Cl.
CPC ......... *G06Q 20/325* (2013.01); *G06Q 20/405* (2013.01); *H04L 67/55* (2022.05)

(58) Field of Classification Search
CPC .... G06Q 40/08; G06Q 20/085; G06Q 20/325; G06Q 20/405
See application file for complete search history.

(56) References Cited

U.S. PATENT DOCUMENTS

| | | | | |
|---|---|---|---|---|
| 2003/0140004 A1* | 7/2003 | O'Leary | .............. | G06Q 20/102 705/40 |
| 2011/0320290 A1* | 12/2011 | Mehew | .................. | G06Q 20/20 705/16 |
| 2012/0011007 A1* | 1/2012 | Blewett | .............. | G06Q 20/3272 705/16 |
| 2012/0323717 A1* | 12/2012 | Kirsch | ............... | G06Q 20/3829 705/26.1 |
| 2013/0117185 A1 | 5/2013 | Collison et al. | | |
| 2015/0161587 A1 | 6/2015 | Khan et al. | | |
| 2015/0371233 A1 | 12/2015 | Simakov et al. | | |
| 2016/0034889 A1* | 2/2016 | Downs | ................. | G06Q 20/382 705/26.41 |
| 2017/0364918 A1* | 12/2017 | Malhotra | ............. | G06Q 20/322 |

(Continued)

FOREIGN PATENT DOCUMENTS

| | | |
|---|---|---|
| WO | 2017184121 | 10/2017 |
| WO | 2018002628 | 1/2018 |

OTHER PUBLICATIONS

"International Application Serial No. PCT/US2020/020124, International Search Report dated May 29, 2020", 5 pgs.

(Continued)

*Primary Examiner* — Bennett M Sigmond
*Assistant Examiner* — Xavier M. Bennett
(74) *Attorney, Agent, or Firm* — Schwegman Lundberg & Woessner, P.A.

(57) ABSTRACT

In an example embodiment, a method for push payment decision routing in relation to a transaction is provided. An example method comprises issuing a virtual payment identifier to a mobile device and receiving payment rules from a mobile device. The user-defined rules include parameters for invoking at least one push payment to be made via the virtual payment identifier for the transaction. Instructions to implement or pay for the transaction as a pull payment are received and, based on the rules, the transaction is completed or paid for a push payment.

20 Claims, 7 Drawing Sheets

(56) References Cited

U.S. PATENT DOCUMENTS

2018/0293573 A1\* 10/2018 Ortiz .................. G06Q 30/0229
2019/0197512 A1\* 6/2019 Nuzzi .................. G06Q 20/027

OTHER PUBLICATIONS

"International Application Serial No. PCT/US2020/020124, Written Opinion dated May 29, 2020", 5 pgs.
"International Application Serial No. PCT US2020 020124, International Preliminary Report on Patentability dated Sep. 10, 2021", 7 pages.

\* cited by examiner

PUSH PAYMENT DECISION ROUTING

TECHNICAL FIELD

The subject matter disclosed herein generally relates to the technical field of special-purpose machines that facilitate adding new features to a payment processor or payment device. The subject matter also relates to an improved payment processor that implements such new features and includes software-configured computerized variants of such special-purpose machines and improvements to such variants, and to the technologies by which such special-purpose machines become improved compared to other special-purpose machines that facilitate adding the new features.

In one aspect, an improved payment processor can perform push payment decision routing.

BACKGROUND

The present subject matter seeks to address technical problems existing in conventional payment processors and systems. For example, national and international financial regulations increasingly require sophisticated authentication and levels of encryption to combat fraud. Meeting these requirements as a payment processor can present significant technical challenges in developing systems that permit regulatory payment while simultaneously preventing non-regulatory payment, and can route funds safely and efficiently worldwide for millions of users with minimum inconvenience.

BRIEF DESCRIPTION OF THE DRAWINGS

Some embodiments are illustrated by way of example and not limitation in the figures of the accompanying drawings.

DETAILED DESCRIPTION

Figure 1:
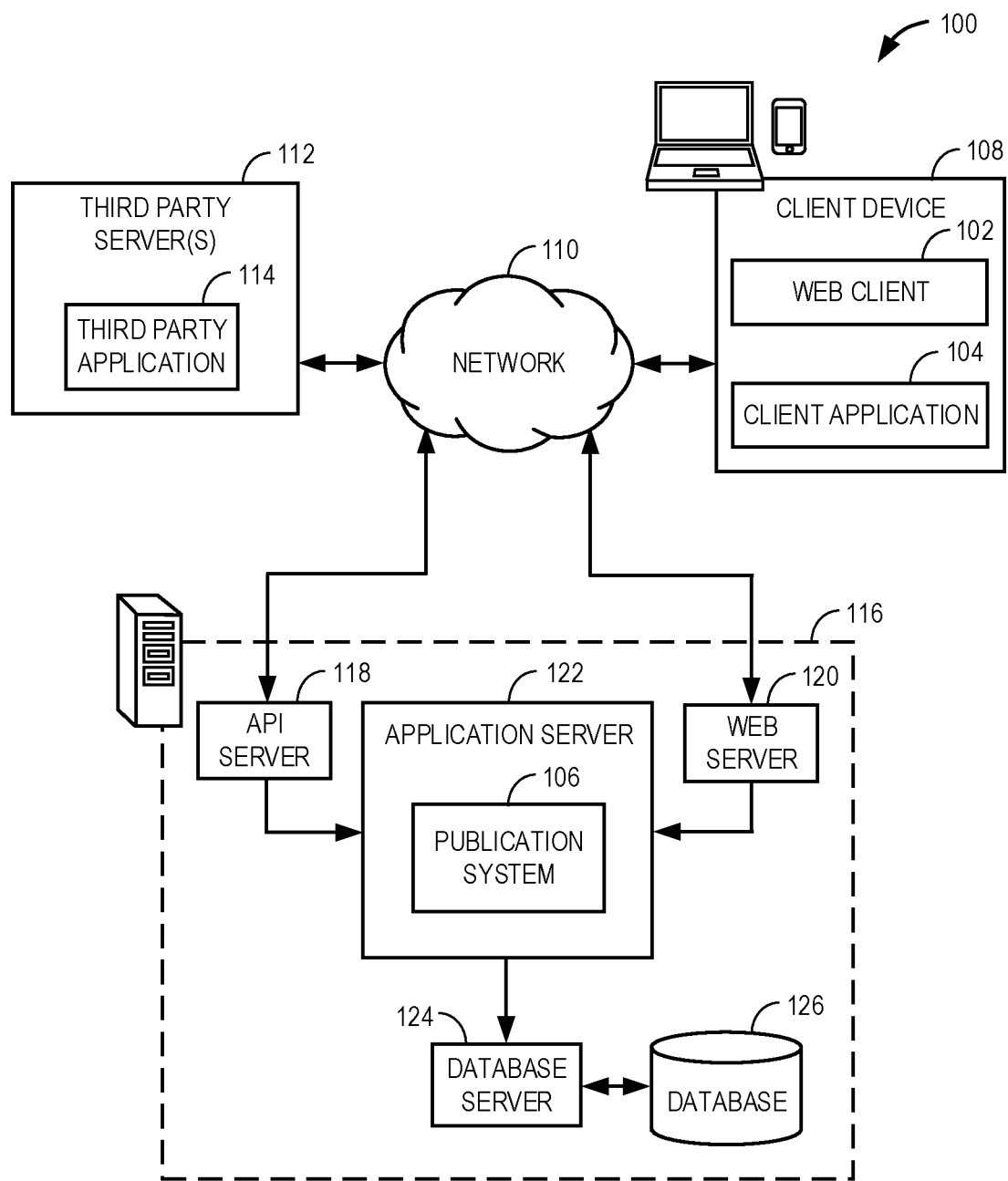
FIG. 1 is a block diagram illustrating a networked system, according to an example embodiment.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device"" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smartphone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

In another context, a "Processor" (e.g., processor 540 in FIG. 5) is a company (often a third party) appointed to handle payment card (e.g., credit card, debit card) transactions. They have connections to various card networks and supply authorization and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB®, and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" or "Issuing Bank" in this context refers to a bank that offers card network or association-branded payment cards directly to consumers. An issuing bank assumes primary liability for the consumer's capacity to pay off debts they incur with their card.

"Payment Information" includes information required to complete a transaction, and the specific type of information provided may vary by payment type. Some payment information will be sensitive (e.g., the card validation code), while other information might not be (e.g., zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Sensitive information" may not necessarily be related to payment information and may include other confidential personal information, such as medical (e.g., HIPAA) information, for example. The ambit of the term "Payment Information" includes "Sensitive Information" within its scope. In some examples, sensitive payment information may include "regulated payment information," which may change over time. For example, currently a merchant cannot collect more than the first six (6) or the last four (4) numbers of a customer's PAN without generally needing to comply with Payment Card Industry (PCI) regulations. But card number lengths may change, and when they do, the "6 and 4" rules will likely change with them. These potential future changes are incorporated within the ambit of "regulated payment information," which is, in turn, included within the ambit of the term "payment information" as defined herein.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. In some figures, the merchant (e.g., a merchant 510 of FIG. 5, or a merchant 610 of FIG. 6) and merchant servers (e.g., merchant servers 512 of FIG. 5) are associated with the merchant site. The merchant site is associated with a client-side application and a server-side application. In one example embodiment, the merchant site includes the merchant servers 512 of FIG. 5, and the server-side application executes on the merchant servers 512.

"Payment Processor" in this context (e.g., a payment processor 530 in FIG. 5) refers to an entity or a plurality of entities that facilitate a transaction, for example between a merchant and a customer's electronic device. With reference to a high-level description illustrated in FIG. 5, in some examples described more fully below, the payment processor includes selected functionality of both the payment processor 530 and processor 540/card networks 550. For example, the payment processor 530 creates tokens and maintains and verifies publishable (non-secret) keys and secret keys. In the illustrated example, the processor 540/card networks 550 are involved in authorizing or validating payment information. In one example embodiment, the payment processor 530 and the processor 540/card networks 550 function together to authorize and validate payment information, issue a token, and settle any charges that are made. Accordingly, in this embodiment, "payment processor" refers to the functionality of the payment processor 530 and the functionality of the processor 540/card networks 550. In another example embodiment, wherein step (3) in the high-level description is not performed, and the payment processor 530 performs its own verification before issuing a token, the processor 540/card networks 550 are still used for settling any charges that are made, as described in step (7). Accordingly, in this embodiment, "payment processor" may refer only to the functionality of the payment processor 530 with respect to issuing tokens. Further, in the example arrangement shown, the payment processor 530, the processor 540, and the card networks 550 are shown as separate entities. In some examples, their respective functions may be performed by two entities, or even just one entity, with the entities themselves being configured accordingly.

"Native Application" or "native app" in this context refers to an app commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which requires interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2019, Stripe, Inc., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. In this specification, the terms "user", "cardholder", and "consumer" are used interchangeably unless the context indicates otherwise.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, Calif. (herein "Stripe") as an example of a payment processor 530) that provides a number of functions and services to the client application 104 that accesses the networked system 116. The client application 104 also provides a number of interfaces described herein, which present output of push payment decision routing to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the programmatic client application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
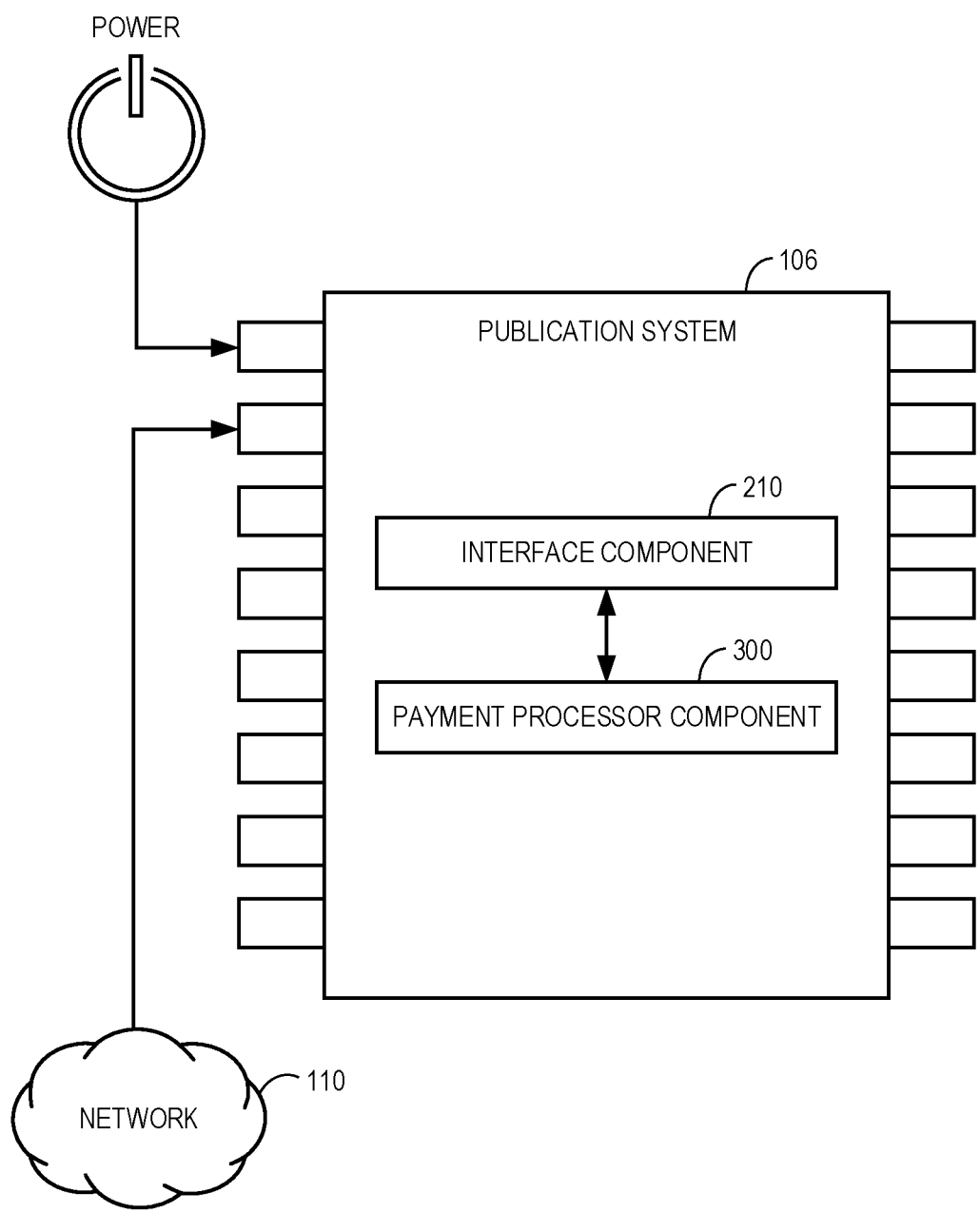
FIG. 2 is a block diagram showing architectural aspects of a publication system, according to some example embodiments.

FIG. 2 is a block diagram showing architectural details of a publication system 106, according to some example embodiments. Specifically, the publication system 106 is shown to include an interface component 210 by which the publication system 106 communicates (e.g., over a network 110) with other systems within the SaaS network architecture 100.

The interface component 210 is communicatively coupled to a payment processor component 300 that operates to provide push payment decision routing for a payment processor in accordance with the methods described herein with reference to the accompanying drawings.

Figure 3:
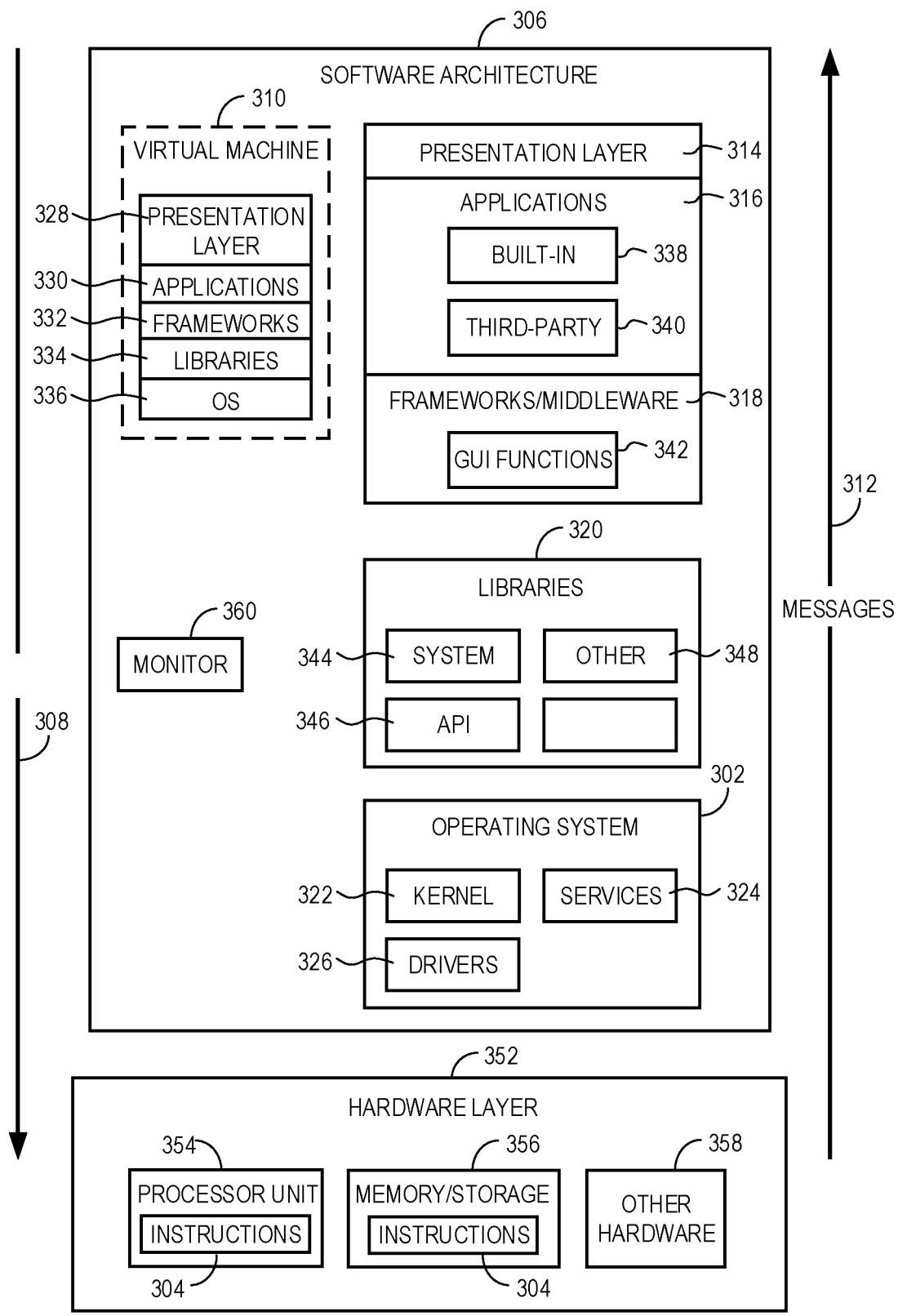
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
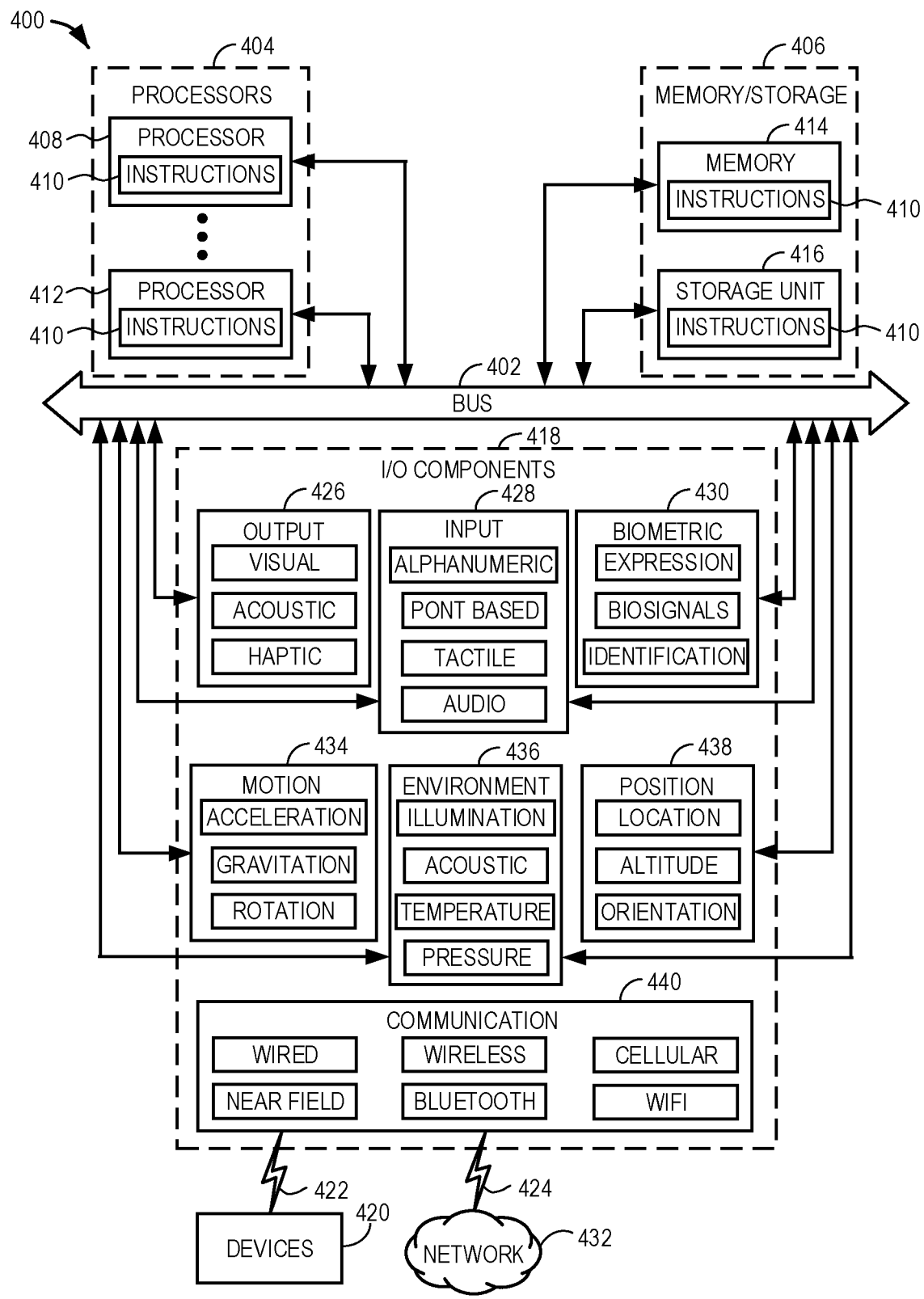
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404

(e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

In some embodiments, a JavaScript library can be embedded into a merchant's checkout form to handle credit card information. When a user attempts to complete a transaction using the checkout form, it sends the credit card information directly from the user's browser to the payment processor's servers. The JavaScript library provides merchants with a set of technologies that can be easily and quickly integrated to securely accept payments online. With the JavaScript library, merchants retain full control of their customers' payment flows, but their servers are never exposed to sensitive payment information.

When added to a merchant's payment form, the JavaScript library automatically intercepts the payment form submission, sending payment information directly to the payment processor and converting it to a single-use token. The single-use token can be safely passed to the merchant's systems and used later to charge customers. Merchants have complete control of their customers' payment experience without ever handling, processing, or storing sensitive payment information.

Figure 5:
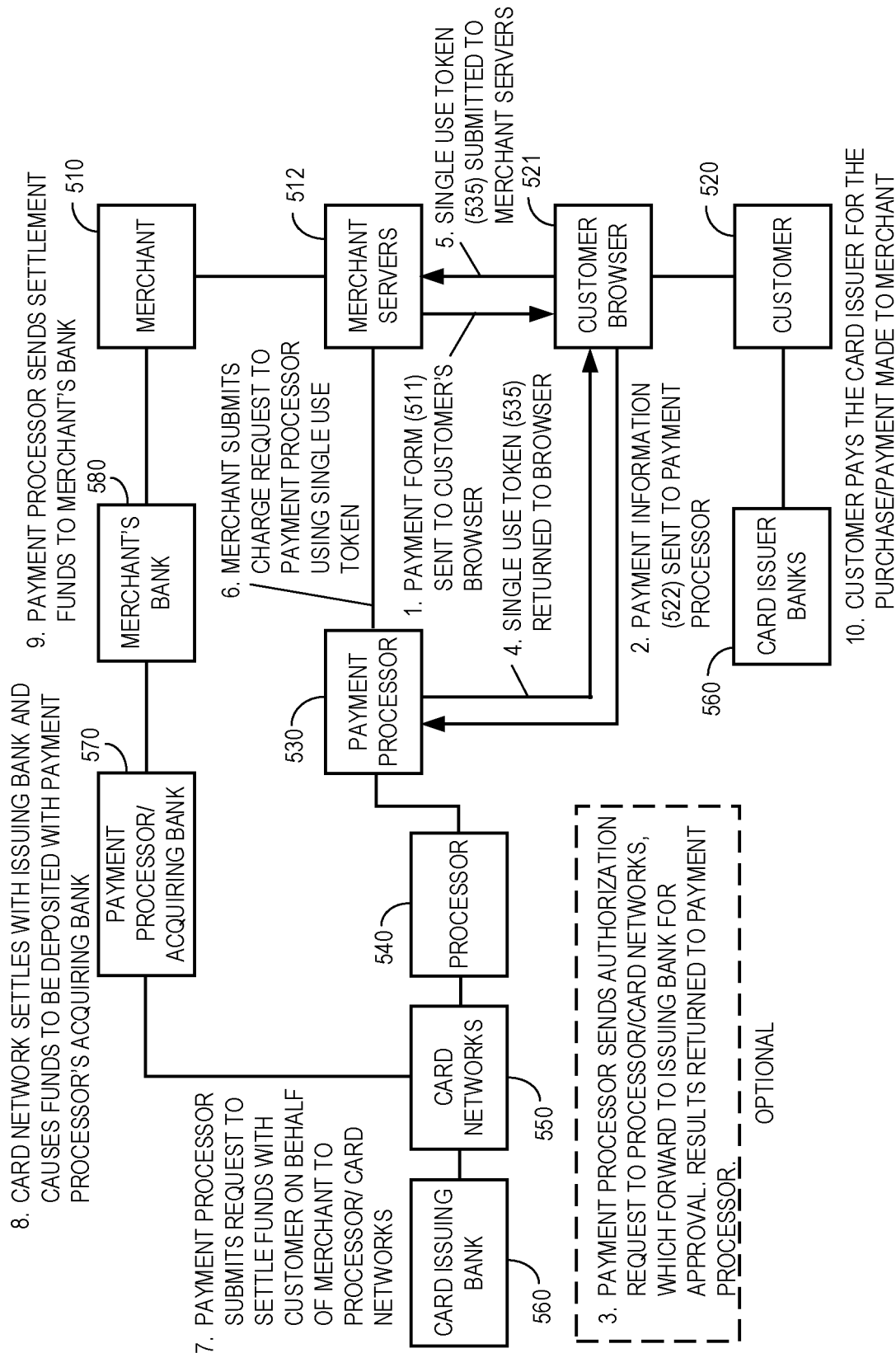
FIG. 5 is a block diagram showing aspects of an online method for conducting a transaction between a merchant site and an electronic user device using a payment processor, according to an example embodiment.

Viewed generally in one example, and with reference to FIG. 5, a payment processing flow is now described:

1. The merchant's customer 520 uses an Internet-enabled browser 521 to visit the merchant's site. The customer 520 is served a JavaScript library—enabled payment form 511 using standard web technologies. The customer 520 enters the specified information including their payment information 522 and submits the payment form 511. The billing info portion of the payment form 511 is for payment via a credit card or debit card. If payment is to be made via an ACH transaction, the billing info portion of the payment form 511 will request a bank routing number and an account number within that bank, and possibly additional information, such as the bank name and whether the account is a checking or savings account.

2. The customer's payment information 522 is sent from the customer's browser 521 to the payment processor 530, never touching the merchant servers 512. In this manner, the client-side application electronically sends payment information retrieved from the customer's electronic device to the payment processor 530. The client-side application does not send the payment information 522 to the server-side application.

3. In one preferred embodiment, the payment processor 530 submits the relevant transaction to a processor 540 or directly to the card network 550 for authorization or validation of the payment information. The card network 550 sends the request to the card issuing bank 560, which authorizes the transaction. In this embodiment, the payment processor 530 and the processor 540/card network 550 function together as a payment processor. In another example embodiment, this step is performed without any communication to the processor 540/card network 550. Instead, the payment processor 530 performs its own authorization or validation of the payment information using heuristic means, such as by checking the Bank Identification Number (BIN), also referred to as the Issuer Identification Number (IIN), against a database of known, valid BINs on file with the payment processor 530. (The BIN is a part of the bank card number, namely the first six digits.) In yet another example embodiment, this step is not performed at all since the authorization or validation is not necessary for the next step (4) to succeed. That is, it is acceptable to create a single-use token in step (4) that represents payment information which has not been validated in any way.

4. If authorized, the payment processor 530 will generate and return a secure, single-use token 535 to the customer's browser 521 that represents the customer's payment information but does not leak any sensitive information. In the example embodiment wherein step (3) is not performed, the payment processor 530 performs this step without waiting to receive authorization from the processor 540 or the card network 550. In this manner, the payment processor 530 creates the token 535 from the payment information sent by the client-side application, wherein the token 535 functions as a proxy for the payment information 522.

5. The payment form 511 is submitted to the merchant servers 512, including the single-use token 535. More specifically, the payment processor 530 sends the token 535 to the client-side application, which, in turn, sends the token 535 to the server-side application for use by the server-side application in conducting the transaction.

6. The merchant 510 uses the single-use token 535 to submit a charge request to the payment processor 530 (or to create a customer object for later use). In this step, the payment processor 530 submits a request to authorize the charge to the processor 540 or directly to the card network 550. This authorization specifies the actual amount to charge the credit card. If an authorization was already done in step (3) for the correct amount, this authorization request can be skipped. This may be a one-time payment for a merchant item, or it may involve registering the payment information with the merchant site for subsequent use in making a payment for a merchant item (a so-called "card on file" scenario). Using the process described in steps (1) through (6), the payment information can be used by the server-side application via the token 535 without the server-side application being exposed to the payment information.

7. The payment processor 530 settles the charge on behalf of the merchant 510 with the processor 540 or directly with the card network 550.

8. The card network 550 causes the funds to be paid by the card issuing bank 560 to the payment processor 530 or to the payment processor's acquiring bank 570.

9. The payment processor 530 causes the settled funds to be sent to the merchant 510 (or to the merchant's bank 580), net of any applicable fees.

10. The card issuing bank 560 collects the paid funds from the customer 520.

Not all of the steps listed above need happen in real time. Other examples, arrangements, and functionality are possible. Applicant's published patent application U.S. 2013/0117185 A1 is incorporated by reference in its entirety in this regard. Typically, when the merchant's customer submits the payment form in step (1), steps (1) through (6) happen in real time and steps (7) through (10) happen later, usually once per day, as a batch process settling all of the funds for all of the payment processor's merchants. In some examples, the payment processor uses an HTTP-based tokenization API in steps (2) and (4) above. Some broader examples may be considered as "tokenization as a service," in which any data is tokenized. One general example may facilitate a merger and acquisition (M&A) analysis in which companies want to compare an overlap in their customer bases. A payment processor (acting as a tokenization service) can tokenize the customers of each company and compare the overlap without revealing confidential information to either party. Unique payment tokens can be adapted to enable and facilitate such a tokenization service.

As mentioned above, factors that can affect technical challenges in providing payment systems include changes in payment regulation. Currently, regulatory authorities work with stakeholders and other parties to push for stronger user authentication measures to combat fraud and online crime. Examples of such regulation include the PSD2 Strong Customer Authentication in Europe and Two-Factor Authentication (2FA) in India. Another example of increased financial protection and regulation includes the implementation by payment systems of an EMV 3D-Secure (3DS) specification to enable multi-factor authentication functionality. Payment systems are required to regularly update and re-certify their 3DS implementation to meet changing regulatory landscapes.

Presently, mobile-based payments in the U.S. are relatively low, with Apple Pay usage (for example) hovering between 3-6% nationally, although payment processors and banks seek to drive this percentage higher. The average credit card transaction amount for UnionPay cards (China) is over twice that of Visa, Mastercard, JCB, and Discover. The difference may be explained by the comfort and ubiquity with which people in China have for push-payment methods (e.g., Alipay WeChat Pay) for lower-dollar transactions Mobile payments in other jurisdictions such as the U.S. may be promoted by making push payments (e.g., ACH transfers) attractive for consumers (e.g., low-value transactions under $20) and attractive also to merchants via a near zero fee. But technical and business challenges in adopting these paradigms still exist. These challenges include the fact that there is no consumer chargeback protection for bank-to-bank transactions, and that the transactions are typically slower to complete. However, there may be some instances where a user is not concerned with chargeback protection, and thus is less inclined to use a credit card. For example, a user may purchase food in a restaurant or fast-food chain (e.g., McDonalds™) where chargeback protection is less of a concern since the food is typically expected to be consumed without incident. Other instances where a need for chargeback protection is lower may include purchasing items via an online retailer such as Amazon™ which provides strong alternate protection such as product returns.

In some examples herein, brick-and-mortar merchants are provided a QR code (or equivalent) such that a consumer's mobile device knows where to push a payment. The merchants are charged no fee (or close to no fee) for these transactions as opposed to credit card transactions as a way to encourage the growth of push payments for low-dollar transactions that don't require chargeback protection. In addition, inherent security features of mobile devices can facilitate compliance with industry regulations, and the nature of push payments eliminates the need for consumers to share their payment details thus reducing the likelihood of those details getting hacked.

One or more of the factors discussed above may present a technical challenge in seeking to shift payments from a "pull" to a "push" type, for example localizing identity information closer to the site of the transaction. Generally speaking, a "push" payment includes an Automated Clearing House (ACH) or money transfer from bank to bank. Bank details are typically needed for such a transaction to occur. A user may be said to "push" funds to a merchant in this way. On the other hand, a "pull" payment includes a merchant checking, at or about the time of a transaction, with an issuing bank that a user is allowed to send funds to the merchant to complete that transaction, based either on a credit reserve or a debit balance in the user's account. A transfer of funds to the merchant is made upon appropriate user authentication. A merchant may be said to "pull" funds to itself in this way. In practical terms, a shift from "pull" payments to "push" payments may imply a shift from the issuer of a card verifying a CVV2 number for a merchant during a transaction, to the consumer's mobile device verifying a user's biometric identifier. In some examples of the improved technology described herein, a push payment is made even where instructions for a pull payment are received. A technical solution is thus provided to the technical problem of how to make one type of payment when instructions for another type of payment are received.

Figure 6:
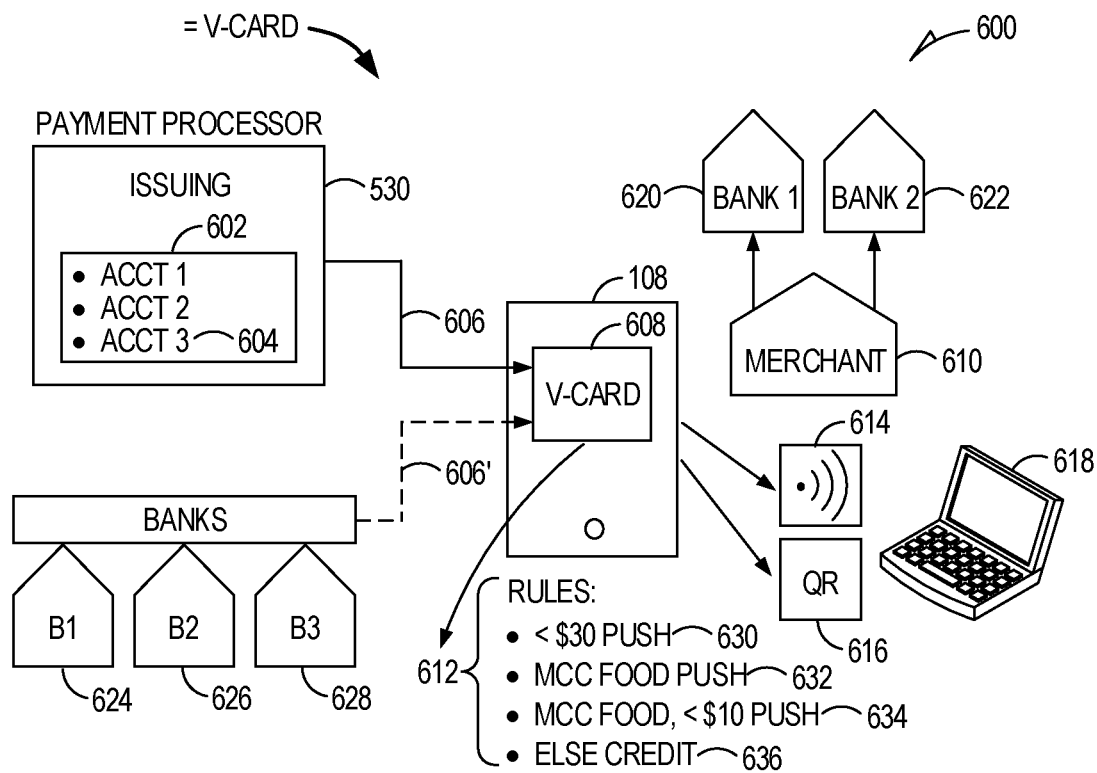
FIG. 6 is a schematic diagram illustrating a networked environment, in accordance with an example embodiment.

FIG. 6 is a schematic diagram of a networked environment 600 illustrating an example payment processor 530, in accordance with an example embodiment. Here, the example payment processor 530 stores data in a database 602. The data includes inter alia details of accounts 604 held by a user. The accounts 604 may include credit reserves or debit balances. The user may operate a mobile device, for example a client device 108 (FIG. 1). At operation 606, the payment processor 530 issues a virtual payment identifier (e.g. a virtual card or "V-card", or a payment token) 608 to the client device 108. In some examples, the virtual payment identifier 608 may be issued by, or associated with, one or more banks 624-628. In some examples, the virtual payment identifier 608 may be stored in association with certain rules 612. The rules 612 may be user-defined rules 612. The rules 612 may be stored in association with the virtual payment identifier 608 in the client device 108, or in the database 602 at the payment processor 530, or in databases at one or more of the banks 624-628.

The user-defined rules 612 may be set up and dynamically adjusted by a user independently of the issuing payment processor 530, or an issuing bank such as the banks 624-628, or other banks 620-622 associated with a merchant 610, for example. The rules 612 may be set up and changed using a specially configured interface in the client device 108, or via a web interface to the payment processor 530 or a bank. In some examples, the rules 612 may be ranked in order of a desired execution or based on predefined elements of transactions for which the virtual payment identifier 608 is intended to be used.

In some examples, the user-defined rules 612 are paramount and take priority over other elements or payment instructions associated with other payment instruments, or sources of funds, or an amount of a credit reserve or debit balance in the accounts 604, for example. The rules 612 may include an instruction to process data received for a pull payment as a push payment. In some examples, one form of payment may be received to implement a given transaction (for example, a credit card in a pull payment), but another form may be used to execute the transaction (for example, an ACH transfer in a push payment). Thus, the present disclosure may allow a user to offer a first financial instrument to implement or authorize a transaction, but a second financial instrument may be used to complete it in accordance with the rules 612. This flexibility or automated switch in payment form allows users, issuers, banks, payment processors, and other parties operating in a financial system to comply more easily in real time with changing financial regulations or increased security risk, for example. The automated switch is dynamically and conveniently configurable by a user through an improved user interface to adapt to changing circumstances.

In some examples, the user-defined rules 612 include parameters defining the invocation of a push payment as opposed to a pull payment. The rule invoking the push payment may override an existing or legacy rule associated with a financial instrument typically used for a pull payment, such as a credit card, for example. With reference again to FIG. 6, at 630, for example, a user may define a rule to instruct that a push payment be used for any transaction under $30. At this transaction level, a user may feel that chargeback protection or the associated chargeback protection fee is not warranted. Similarly, at 632, a user may include in a rule 612 a parameter for transactions classified under the Merchant Classification Code (MCC) as food. This rule would invoke push payments targeted at both the McDonalds™ discussed further above and more expensive restaurant examples. On the other hand, at 634, a user may define a rule to limit push payments to food transactions made at fast-food outlets only. Here, a rule parameter may include a further transaction threshold of $10, accordingly. For other instances, at 636, the user may instruct in a rule that any other transaction be completed using a pull payment such as a credit card, for example.

Thus, in some examples, the user employs the virtual payment identifier 608 to perform transactions at the merchant 610. In some examples, the transactions are conducted using a contactless pad 614 or QR code 616 to exchange information between the client device 108 and a point-of sale-machine 618 at the merchant 610. A transaction is concluded in accordance with the rules 612. If a push payment is invoked accordingly, the user authenticates himself or herself to their client device 108 using a biometric identifier, a passphrase, or a bank-initiated SMS or a push notification, for example. This authentication serves as the basis for an authentication message. The virtual payment identifier 608 receives the authentication message, and if the amount is less than $30 (per the user-defined rule at 630), then the payment is made via a push payment including a bank-to-bank transfer from consumer to merchant, for example. Alternatively, if the amount is greater than $30, then the amount is authorized to be paid for example by a credit card or other payment instrument that the user (cardholder) has previously received or tokenized with the payment processor 530, or received from a bank 624-628, or 620-622.

Some examples include other payment methods instead of or in addition to a credit card. For example, a user may set a rule that allowing selection of a payment instrument based on the country of origin of a merchant. In some examples, a user based in the UK may invoke a rule mandating a UK bank account for push payments. Alternatively, a user based in France (or temporarily on vacation in France) may select a French bank account for push payments. In a further example, a user based in Germany may select to use a Girocard™ (German debit network card) rather than a Visa™ (credit card) to avoid high cross-border transaction fees. In some examples, a user is enabled to carry one "payment instrument" that is backed (funded) by a range of credit or debit accounts that are either country specific or agnostic.

Details of the transaction, for example as standardized in a message format referred to as ISO 8583, are routed via the merchant's acquiring bank or processor to the issuing payment processor 530 (or bank 620-628), and funds are transferred to the merchant's bank by the processor or bank as a push or pull payment under the user-defined rules 612, accordingly. The routing may occur over credit or debit networks.

If the rules 612 are stored in the database 602 at the issuing payment processor 530 (or bank), they are read and invoked by the issuing payment processor 530 (or bank) at the time of processing the transaction upon receipt of the transaction details. If a push payment is invoked, details of the merchant's bank 620 may be required. These are typically not provided in association with a user's credit card, or virtual payment identifier 608, or a credit card linked to the virtual payment identifier 608. In some examples, the client device 108 is configured to capture these details by the QR code, Bluetooth beacon, or RFID tag 616 and route them to the issuing payment processor 530 to complete the push payment at hand.

In some examples, a dynamic toggle is provided in the user interface of the client device 108 or a web interface of the payment processor or bank so as to define, for a given transaction and/or at the time of the transaction, what to route as a push payment and what to route as a pull payment (e.g., credit card). For example, during a store checkout, a user may operate the toggle to invoke a push payment or pull payment based on present circumstances or transaction details on the fly, so to speak, as opposed to being based on rules stored in the database 602 or in the client device 108. Thus, the rules 612, or basis for a push or pull payment, may be extremely transient in some examples.

Viewed from a user perspective, other rule-based factors may include a desire of a user to execute a percentage of their payments each month as push payments (for example, "I'm budgeting $1000 this month; I will allocate 80% of spend dollars as push, the rest can go on my credit card"). In some examples, the rules 612 may be set by a user based on other factors, or at a system level. For example, a rule 612 may include a dynamic threshold based on a merchant fraud profile and/or be based on a risk analysis (for example, a low fraud risk perceived at Starbucks™ for charges under $30). Thus, a push payment rule 612 may include an entity parameter, as well as a transaction amount threshold. In some examples, a security analysis may include factors such as a speed of location change, a transaction velocity, a security regulation, and a geographic location or region. The rules 612 may also be set based on push payment incentives, pull payment disincentives, or other factors. In some examples, the rules 612 are set automatically based on one or more of the parameters or factors discussed herein. Some rules 612 may be set by or include a combination of manual and automatic features.

Viewed from a merchant perspective, a merchant may be prepared to accept a higher percentage of chargeback risk during a given period, for example, during a financial quarter. In some examples, using a toggle or slider presented in the user interface of a client device 108, the merchant 610 can dynamically adjust a general transaction threshold so that more of the quarterly transaction charges are routed as push payments. This adjustment to a higher percentage of push payments can lower overall transaction costs to the merchant while balancing chargeback risk.

In each of the embodiments described herein, a client device 108 may be configured, or caused to be configured, by a payment processor 530, or bank 620-628, or an operating system such as iOS or Android, to execute the operations or provide the functionality described herein.

Thus, in some embodiments, a system is provided for push payment decision routing in relation to a transaction. An example system may comprise a network; one or more hardware processors; and a memory storing instructions that, when executed by at least one processor among the processors, cause the scheduling system to perform operations comprising, at least: issuing a virtual payment identifier to a mobile device; receiving payment rules from a mobile device, the rules including parameters for invoking at least one push payment to be made via the virtual payment identifier for the transaction; receiving instructions to implement or pay for the transaction as a pull payment; and based on the rules, completing or paying for the transaction as a push payment.

In some system examples, the rules are defined by a user of the mobile device. In some system examples, at least one parameter of the parameters includes a monetary threshold for invoking the push payment. In some system examples, at least one rule of the payment rules is based on a financial regulation. In some system examples, receiving the instructions to implement or pay for the transaction includes receiving data relating to a first payment instrument or payment type. In some system examples, completing or paying for the transaction as a push payment comprises using data relating to a second payment instrument or payment type, or a bank. In some system examples, the rules are stored in the mobile device.

Figure 7:
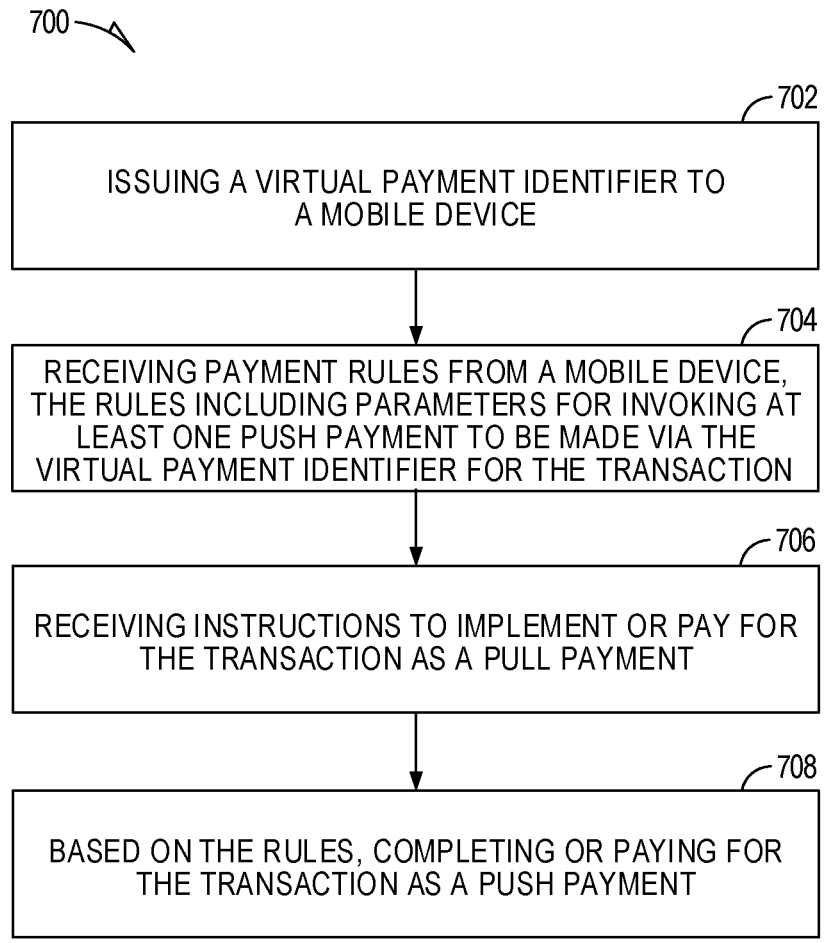
FIG. 7 is a flow diagram illustrating a method for processing push payment decision routing, in accordance with an example embodiment.

FIG. 7 is a flow diagram illustrating a method 700, for processing push payment decision routing, in accordance with an example embodiment. The example method 700 includes, at operation 702, issuing a virtual payment identifier to a mobile device; at operation 704, receiving payment rules from a mobile device, the rules including parameters for invoking at least one push payment to be made via the virtual payment identifier for the transaction; at operation 706, receiving instructions to implement or pay for the transaction as a pull payment; and, at operation 708, based on the rules, completing or paying for the transaction as a push payment.

Example method embodiments may include one of more of the following aspects or operations. For example, the rules may be defined dynamically by a user of the mobile device i.e. user-defined, as opposed to statically like a bank as a third party. At least one parameter of the parameters may include a monetary threshold for invoking the push payment. In some examples, at least one rule of the payment rules is based on a financial regulation. In some examples, receiving the instructions to implement or pay for the transaction includes receiving data relating to a first payment instrument or payment type. In some examples, completing or paying for the transaction as a push payment comprises using data relating to a second payment instrument or payment type, or a bank. The rules may be stored in the mobile device in some examples.

It should also be noted that the above techniques are described as being performed by the payment processor; however, some or all of the operations may be performed by a different entity, such as by the merchant itself (using, for example, a JavaScript library of functions provided by the payment processor).

Some embodiments include machine-readable media including instructions which, when read by a machine, cause the machine to perform the operations of any one or more of the methodologies summarized above, or described elsewhere herein.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for push payment decision routing in relation to a transaction, the method comprising:
   issuing a virtual payment identifier to a mobile device;
   receiving payment rules from a mobile device, the rules including parameters for invoking at least one push payment to be made via the virtual payment identifier for the transaction;
   initiating the transaction as a pull payment from the mobile device;
   authorizing the transaction using verification data associated with the pull payment, the verification data including verification a user is allowed to send funds to complete the transaction; and
   based on the received rules, completing the transaction as a push payment from the mobile device instead of as a pull payment, the completing of the transaction including verifying a biometric identifier of the user of the mobile device.

2. The method of claim 1, wherein the rules are defined by the user of the mobile device.

3. The method of claim 1, wherein at least one parameter of the parameters includes a monetary threshold for invoking the push payment.

4. The method of claim 1, wherein at least one rule of the payment rules is based on a financial regulation.

5. The method of claim 1, wherein initiating the transaction includes receiving data relating to a first payment instrument or payment type.

6. The method of claim 5, wherein completing the transaction as a push payment comprises using data relating to a second payment instrument or payment type, or a bank.

7. The method of claim 2, wherein the rules are stored in the mobile device.

8. A system for push payment decision routing in relation to a transaction, the system comprising:
   one or more hardware processors; and
   a memory storing instructions that, when executed by at least one processor among the processors, cause the at least on processor to perform operations comprising:
   issuing a virtual payment identifier to a mobile device;
   receiving payment rules from a mobile device, the rules including parameters for invoking at least one push payment to be made via the virtual payment identifier for the transaction;
   initiating the transaction as a pull payment from the mobile device;
   authorizing the transaction using verification data associated with the pull payment, the verification data including verification a user is allowed to send funds to complete the transaction; and
   based on the received rules, completing the transaction as a push payment from the mobile device instead of as a pull payment, the completing of the transaction including verifying a biometric identifier of the user of the mobile device.

9. The system of claim 8, wherein the rules are defined by the user of the mobile device.

10. The system of claim 8, wherein at least one parameter of the parameters includes a monetary threshold for invoking the push payment.

11. The system of claim 8, wherein at least one rule of the payment rules is based on a financial regulation.

12. The system of claim 8, wherein receiving the instructions to implement the transaction includes receiving data relating to a first payment instrument or payment type.

13. The system of claim 12, wherein completing the transaction as a push payment comprises using data relating to a second payment instrument or payment type, or a bank.

14. The system of claim 8, wherein the rules are stored in the mobile device.

15. A non-transitory machine-readable medium comprising instructions which, when read by a machine, cause the machine to perform operations for push payment decision routing in relation to a transaction, the operations comprising, at least:
   issuing a virtual payment identifier to a mobile device;

receiving payment rules from a mobile device, the rules including parameters for invoking at least one push payment to be made via the virtual payment identifier for the transaction;

initiating the transaction as a pull payment from the mobile device;

authorizing the transaction using verification data associated with the pull payment, the verification data including verification a user is allowed to send funds to complete the transaction; and based on the received rules, completing the transaction as a push payment from the mobile device instead of as a pull payment, the completing of the transaction including verifying a biometric identifier of the user of the mobile device.

16. The medium of claim 15, wherein the rules are defined by the user of the mobile device.

17. The medium of claim 15, wherein at least one parameter of the parameters includes a monetary threshold for invoking the push payment.

18. The medium of claim 15, wherein at least one rule of the payment rules is based on a financial regulation.

19. The medium of claim 15, wherein receiving the instructions to implement the transaction includes receiving data relating to a first payment instrument or payment type.

20. The medium of claim 19, wherein completing the transaction as a push payment comprises using data relating to a second payment instrument or payment type, or a bank.

* * * * *

UNITED STATES PATENT AND TRADEMARK OFFICE
CERTIFICATE OF CORRECTION

PATENT NO. : 11,526,867 B2
APPLICATION NO. : 16/288954
DATED : December 13, 2022
INVENTOR(S) : Michael David Dahn et al.

Page 1 of 1

It is certified that error appears in the above-identified patent and that said Letters Patent is hereby corrected as shown below:

In the Claims

Column 20, Lines 29-30 (Claim 8): Replace "cause the at least on processor to perform" with --cause the at least one processor to perform--.

Signed and Sealed this
Twenty-fifth Day of July, 2023

Katherine Kelly Vidal
*Director of the United States Patent and Trademark Office*